United States Patent [19]

Gill et al.

[11] Patent Number: 5,407,583

[45] Date of Patent: Apr. 18, 1995

[54] CONTROLLING SCALE IN BLACK LIQUOR EVAPORATORS

[75] Inventors: Jasbir S. Gill, McKees Rocks; Kenneth F. Henderson, Pittsburgh, both of Pa.

[73] Assignee: Calgon Corporation, Pittsburgh, Pa.

[21] Appl. No.: 92,171

[22] Filed: Jul. 15, 1993

Related U.S. Application Data

[60] Division of Ser. No. 988,544, Dec. 10, 1992, Pat. No. 5,254,286, which is a continuation-in-part of Ser. No. 708,522, May 31, 1991, abandoned.

[51] Int. Cl.⁶ ................................................ C02F 5/12
[52] U.S. Cl. .................................. 210/701; 159/47.3; 162/38; 162/48; 210/698; 252/180
[58] Field of Search ................ 159/47.1, 47.3; 162/38, 162/39, 48; 210/698–701; 252/80, 82, 180, 181

[56] References Cited

U.S. PATENT DOCUMENTS

| | | | |
|---|---|---|---|
| 2,358,222 | 9/1944 | Fink et al. | 210/697 |
| 2,539,305 | 1/1951 | Hatch | 252/175 |
| 2,783,200 | 2/1957 | Crum et al. | 210/701 |
| 2,980,610 | 4/1961 | Ruchrwein | 210/701 |
| 3,285,886 | 11/1966 | Gunderson et al. | 210/701 |
| 3,289,734 | 12/1966 | Robertson et al. | 210/928 |
| 3,434,969 | 3/1969 | Ralston | 210/700 |
| 3,463,730 | 8/1969 | Booth et al. | 210/701 |
| 3,514,476 | 5/1970 | Morita | 556/25 |
| 3,516,910 | 6/1970 | Engman et al. | 210/735 |
| 3,518,204 | 6/1970 | Hansen, Jr. et al. | 252/181 |
| 3,928,196 | 12/1975 | Persinski et al. | 210/701 |
| 3,965,027 | 6/1976 | Boffardi et al. | 252/180 |
| 4,072,607 | 2/1978 | Schiller et al. | 203/7 |
| 4,164,521 | 8/1979 | Goodman | 525/187 |
| 4,166,040 | 8/1979 | Goodman | 252/180 |
| 4,166,041 | 8/1979 | Goodman | 252/180 |
| 4,205,143 | 5/1980 | Goodman | 525/213 |
| 4,357,207 | 11/1982 | Yorke | 252/180 |
| 4,457,847 | 7/1984 | Lorenc et al. | 210/698 |
| 4,640,793 | 2/1987 | Persinski et al. | 252/82 |
| 4,650,591 | 3/1987 | Boothe et al. | 210/700 |
| 4,671,888 | 6/1987 | Yorke | 252/180 |
| 4,698,161 | 10/1987 | Hansen | 210/698 |
| 4,867,945 | 9/1989 | Sherwood et al. | 422/16 |
| 4,933,090 | 6/1990 | Gill et al. | 210/700 |
| 4,936,987 | 6/1990 | Persinski et al. | 210/699 |
| 5,254,286 | 10/1993 | Gill et al. | 210/700 |

OTHER PUBLICATIONS

Hatch & Rich, Indust. Eng. Chem. 31: 51–53, 1939.
Kabanoy & Zezin, Makroma. Chem. Suppl. 6: 259–276, 1984.

*Primary Examiner*—Peter A. Hruskoci
*Attorney, Agent, or Firm*—Craig G. Cochenour; William C. Mitchell; Michael J. Kline

[57] ABSTRACT

An anionic/cationic polymer mixture comprising:

(a) a polyanion selected from polyacrylic acid, polymethacrylic acid, and polymaleic anhydride, each optionally copolymerized with each other, or optionally copolymerized with acrylamide up to a molar unit ratio of 1:1, provided that the total polyanionic weight average molecular weight is from about 1 to 5 thousand, and (b) the polycation poly(dimethyldiallylammonium chloride) having a weight average molecular weight of from about 25 thousand to 1 million, wherein the weight ratio of polyanion (a) to polycation (b) is from 1:2 to 1:8, has been found to give excellent inhibition of the formation, deposition and adherence of various alkali metal and alkaline earth metal scales, e.g., sodium sulfate, sodium carbonate and calcium carbonate scales in the stringent conditions which characterize black liquor heaters, evaporators, etc. in paper mills, particularly in association with Kamyr and similar wood chip digesters, characterized by elevated pH's of 12 and higher, high dissolved organic and inorganic solids concentrations, and elevated temperatures and pressures.

5 Claims, No Drawings

CONTROLLING SCALE IN BLACK LIQUOR EVAPORATORS

This is a division of application Ser. No. 07/988,544, filed Dec. 10, 1992, U.S. Pat. No. 5,254,286, which is a CIP of the parent application Ser. No. 07/708,522 filed on May 31, 1991, abandoned.

BACKGROUND OF THE INVENTION

FIELD OF THE INVENTION

The present invention relates to compositions and methods for inhibiting the formation, deposition and adherence of alkali metal and alkaline earth metal scale deposits, e.g., sodium sulfate ($Na_2SO_4$), sodium carbonate ($Na_2CO_3$), and calcium carbonate ($CaCO_3$) scale deposits, on metallic surfaces of heaters, evaporators and other heat exchanger surfaces used for the processing of black liquor in the paper making process, particularly in association with Kamyr and similar wood chip digesters.

Origin of Black Liquor

In the production of kraft paper by the sulfate process, bark and chipped wood are treated with an alkaline aqueous liquid to remove certain organic contaminants from the wood, of which lignin is the chief component. Typically, commercially, the chips are cooked in a 10 percent solution of sodium hydroxide which contains about 20 mole percent of sodium sulfide. This reaction is usually conducted at temperatures of approximately 160° to 180° C. for a period of time ranging between 1 and 3 hours.

The resultant organic residues are removed from the chips by washing, which wash water contains dissolved lignin, emulsified soaps, endogenous surfactants, other organic ingredients, and substantial amounts of inorganic salts and bases, including calcium carbonate. This wash water is referred to as black liquor.

Black Liquor and Scale Formation

The black liquor will show variations in composition from mill to mill; however, in most instances, inorganic carbonates, sulfides, sulfites, sulfates and silica are present, as well as organic sulfur compounds. The makeup of a typical black liquor is set out further below. While the makeup of the black liquor may vary from time to time even where the same type of pulp is being produced, and will clearly vary where different types of pulp are involved, the same stringent conditions are confronted in the processing of black liquor which have heretofore rendered practical treatment of scale deposits ineffective.

These stringent conditions are characterized by elevated pH's of 12 and higher, high dissolved organic and inorganic solids concentrations, and elevated temperatures and pressures. Black liquor is processed in two ways which bring it into contact with heat exchange surfaces leading to the formation of adherent scale deposits which are speculated to be in accordance with well known mechanisms described in detail further below: evaporative recovery and the wood chip digestion process itself. Both of these will now be described in more detail.

Black Liquor Evaporative Recovery

It is common practice in large mills to recover the inorganic components of the liquor and to use the organic portion as fuel. As produced, the black liquor will usually contain about 12 percent by weight of solid material. Before the liquor can be used as fuel and the inorganic components recovered, it is necessary that the material be concentrated, usually to a solids content of about 45 percent by weight or higher. The concentrating of the black liquor is usually conducted in multiple-effect evaporators. These evaporators are ordinarily operated by employing the steam produced in the highest pressure evaporator to heat the next highest pressure evaporator. The flow of liquor is counter-current to the flow of pressure and steam. In evaporators containing black liquor of the lowest solids concentration, the steam used usually produces a vacuum in the system.

A common problem which arises with use of a black liquor multiple-effect evaporator is formation of substantial amounts of deposits which tend to stick to the interior walls or tubes of the evaporator units and remain in a tightly adherent state. The problem of preventing deposition of material upon the metal surfaces of the various units of a multiple-effect evaporator is particularly difficult to overcome in that the black liquor has a tendency to deposit out both inorganic and organic materials. The organic substances then act as a type of binder for the inorganic materials, with the entire mass becoming a tightly adherent mass clinging to the metal surface walls of the evaporators. It is believed that this phenomenon accounts for the reason that many prior art deposit inhibitors show little or no activity in inhibiting deposition of materials in a black liquor evaporator system.

A buildup of deposit formation results in a situation of measurably decreased overall efficiency of evaporation. For example, the deposit formation tends to materially decrease heat transfer, requiring an increased heat input to accomplish desired evaporation. Likewise, the problem of deposition leads to more frequent boil-outs with hot water or acids and a substantial increase in downtime. Deposit formation can occur in any of the effects of the multiple effect evaporator. There are usually 5 to 6 effects in each evaporator set, each effect containing a plurality of long-tube vertical units.

Black Liquor Digester Processes

Another area of the paper making process in which black liquor processing brings the black liquor into contact with heat exchange surfaces and leads to adherent scale deposits, and therefore with which the compositions and methods of the present invention are especially usefull, is the Kamyr and similar wood chip digesters, which have been in commercial use for several decades. Processes using these digesters involve heating of the black liquor and its subsequent use as part of the digestion of the wood chips to form pulp. Thus, adherent scale deposits tend to form not only on the surfaces of the black liquor heaters, but on the surfaces of the Kamyr and other digesters themselves.

In the vertical downflow type of continuous Kamyr digester, wood chips are fed at low pressure to a horizontal steaming vessel, where a slowly turning screw carries the chips and exposes them to flash steam which preheats the chips and drives off air and other noncondensibles. The chips are then carried by a cooking liquor to a cylindrical separator/digester where a perforated plate allows liquor to flow to the surrounding collection ring and be returned to the feeder, while the chips are pushed downwardly by a rotating helical screw. A hydraulic pressure of 165 psig is maintained on the liquid column by regulating the flows of white and black liquor to the digester.

The chips flow downward uniformly as a mass through the various zones of the digester: impregnation, heating, cooking and washing. The duration of the alkali impregnation zone is about 45 min at temperatures from 105°–130° C. The temperature is raised in two steps in the heating zone using forced circulation of the black liquor through external heat exchangers. The pulping reactions are then completed in the cooking zone, and stopped by displacement of the hot residual liquor with dilute "wash" liquor from below. The hot liquor is extracted through screens at the periphery into a flash tank that supplies steam to the steaming vessel.

The wash liquor moves in the opposite direction to the downward chip flow, and thus is injected at the bottom of the digestion vessel and moves upward, allowing it to provide "diffusion washing". The overall height of the digester is sufficient, taking into account the distance between the wash water inlet and the extraction screens and rate of movement of the liquor, to allow at least 1.5 hrs for the residual liquor to diffuse out of the chips. Pulp is continuously removed from the bottom of the digester, which is maintained at about 200 psig., to an atmospheric tank.

Modifications of the basic Kamyr hydraulic digester process described above which relate to the potential formation of adherent scale deposits, have included development of the vapor phase digester for sulfite and prehydrolyzed kraft production, which utilizes an inclined separator, and the development of a two-vessel system with a separate impregnation vessel and vapor phase digester in which the outside inclined separator has been replaced with an inverted internal separator.

It can be seen from the above description that there are a number of locations in the equipment for carrying out the wood chip digestion process at which there is potential for the formation of troublesome adherent scale deposits derived from black liquor. It is to the inhibition of all such deposits that the compositions and methods of the present invention are directed.

Adherent Scale Formation

The description above relates to the very significant and complex problems which are encountered when black liquor is contacted with heat exchange surfaces during various phases of the paper making process. To some extent, although not fully understood, the basic mechanims of scale formation which are fairly well known in such traditional areas as boilers and cooling towers, doubtless play some role in scale formation from black liquor in paper making. Thus, in order to provide a better understanding of the present invention, those basic mechanisms will now be briefly described.

As already mentioned, black liquor will contain a number of dissolved salts, and the alkali metal cation sodium is usually prevalent, while the alkaline earth metal cation calcium is also present, as are the anions sulfate and carbonate. The combination product of sodium and calcium cations and sulfate and carbonate anions will precipitate from the black liquor in which they are carried to form scale deposits when the concentration of the anion and cation comprising the reaction product, e.g., sodium sulfate, sodium carbonate, and calcium carbonate, exceeds the solubility of the reaction product itself. Thus, when the concentrations of sodium and calcium ions and sulfate and carbonate ions exceed the solubility of the sodium sulfate, sodium carbonate, and calcium carbonate reaction products, a solid phase of sodium sulfate, sodium carbonate, and calcium carbonate will form as a precipitate. Precipitation of the reaction product will continue until the solubility product concentrations of the constituent ions are no longer exceeded.

Numerous factors may be responsible for producing a condition of supersaturation for any given reaction product. Among such factors are changes in the pH of the water system, evaporation of the water phase, rate of heat transfer, amount of dissolved solids, and changes in the temperature or pressure of the system. As already discussed, all of these factors are present in the stringent conditions which characterize black liquor processing in paper making.

The mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming sodium sulfate, sodium carbonate, and calcium carbonate salt reaction products is first exceeded in this thin film, and crystallization of the respective scales results directly on the heating or heat exchange surface.

In addition to this, a probable source of scale in black liquor processing in paper making is the concentration of solids dissolved in the water of the black liquor not only by leaching of solids from the digesting wood chips, but also by repeated evaporation of portions of the water phase, as, e.g., when portions of the black liquor are flash evaporated to provide steam. Moreover, alkalinity from the alkali digesting solution as well as from dissolved solids from the wood chips, results in an increasing alkalinity of the black liquor, often reaching pH's of 12-13 and even higher. Conventional scale inhibiting compositions typically fail in systems having such severe conditions.

As already adverted to, the formation of sodium sulfate, sodium carbonate, calcium carbonate and other scale deposits poses a serious problem in a number of regards. The sodium sulfate, sodium carbonate, calcium carbonate and other scales which are formed possess a low degree of heat conductivity. Thus, e.g., a sodium sulfate or calcium carbonate scale deposit is essentially an insulating layer imposed across the path of heat travel from whatever source to the black liquor being processed in the system. Increased input of heat to compensate for this loss results in overheating of the metal surface of the heat exchanger and consequent tube failures, for example. In addition to this problem, scale formation facilitates corrosive processes, and a substantial scale deposit will interfere materially with fluid flow. Consequently, scale is an expensive problem in the paper making process, causing delays and shutdowns for cleaning and removal.

Although the present invention is directed primarily to preventing or inhibiting the deposition of sodium sulfate, sodium carbonate, and calcium carbonate scales, the most prevalent types of scale deposits, it is also applicable to inhibiting the deposition of other types of alkali metal and alkaline earth metal scales. For example, black liquor contains alkali metal cations such as sodium and potassium, and alkaline earth metal cations, such as calcium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until their product solubility concentrations are no longer exceeded. These precipitates are alkali metal and alkaline earth metal scales. Thus, by alkali metal and alkaline earth metal scales is meant scales including but not limited to sodium sulfate, sodium carbonate, calcium carbonate, magnesium carbonate, calcium phosphate, and calcium sulfate. These scales form frequently in the tubes of heat exchangers and on other heat exchange surfaces, as well as on various surfaces of digester equipment in contact with black liquor being processed during paper making.

The anionic/cationic polymer mixtures of the present invention are used in the same range of amounts as threshold inhibitors in the scale inhibition method of the present invention, rather than as sequestering or chelating agents, even though the compositions of the present invention appear to have dispersant properties as well and significantly reduce the adherency of any scale deposit which is formed, facilitating its easy removal.

Heretofore, in the art of scale inhibition as it related to the traditional areas of boilers and cooling towers, it was recognized that scale-forming compounds could be prevented from precipitating by inactivating their cations with chelating or sequestering agents, so that the solubility of their reaction products was not exceeded. Generally, this required many times as much chelating or sequestering agent as cation, since chelation is a stoichiometric reaction, and these amounts were not always desirable or economical. However, several decades ago, it was discovered that certain inorganic polyphosphates would prevent such precipitation when added in amounts far less than the concentrations needed for sequestering or chelating. Nevertheless, even such agents as these have not been found to be particularly effective in controlling scale deposits on equipment used for black liquor processing.

When a precipitation inhibitor is present in a potentially scale-forming system at a markedly lower concentration than that required for sequestering the scale-forming cation (stoichiometric), it is said to be present in "threshold" amounts. See, for example, Hatch and Rice, Indust. Eng. Chem., 31, 51–53 (1939); Reitemeier and Buehrer, J. Phys. Chem., 44 (5), 535–536 (1940); Fink and Richardson U.S. Pat. No. 2,358,222; and Hatch, U.S. Pat. No. 2,539,305.

Generally, sequestering takes place at a weight ratio of sequestration compounds to scale-forming cation components of greater than about 10:1, depending on the anion components in the water. Threshold inhibition generally takes place at a weight ratio of threshold active compounds to scale-forming cation components of less than about 0.5:1.0.

Similarly, anionic and cationic polymers can be used as dispersants in accordance with methods known in the art of scale inhibition, but the dosage levels necessary to achieve dispersion are in the range of 0.5–10% by weight of the system being treated, which is many orders of magnitude higher that the dosage levels used for the compositions of the present invention. Thus, it is a unique aspect of the present invention that it is possible to achieve essentially non-adherent scale on black liquor processing equipment using only threshold inhibitor dosage levels of the compositions of the present invention.

Recently in the art of scale inhibition, attention has been focused on controlling scaling under severe conditions, where conventional treatments such as those described above do not provide complete scale control, and these are thought to more closely duplicate the stringent conditions found in processing of black liquor. Current technology in traditional scale control, e.g., in cooling towers, can be used to inhibit $CaCO_3$ scale up to 100 to 120 times calcite saturation, i.e., a water containing $Ca^{2+}$ and $CO_3^{2-}$ present at 100 times (100 X) their solubility limit. Severity of the scaling tendency of a water sample is measured using the saturation index, which may be derived in accordance with the following equation:

$$SI = \frac{(Ca^{2+})(CO_3^{2-})}{K_{sp}CaCO_3}$$

where SI is the saturation index for calcium carbonate, $(Ca^{2+})$ is the concentration of free calcium ions, $(CO_3^{2-})$ is the concentration of free carbonate ions, and $K_{sp}CaCO_3$ is the conditional solubility product constant for $CaCO_3$. All of the quantities on the right side of the above equation are adjusted for pH, temperature and ionic strength.

One problem which will usually be encountered with scale inhibiting compositions known in the traditional art of scale inhibition is their calcium tolerance. Calcium tolerance is a measure of a chemical compound's ability to remain soluble in the presence of calcium ions $(Ca^{2+})$. One of the parameters of scale control under severe conditions is pH. As pH increases, calcium tolerance decreases rapidly for traditional $CaCO_3$ threshold inhibitors, e.g., HEDP and AMP. These inhibitors precipitate with calcium at alkaline pH's, rendering them useless as threshold scale inhibitors. Since the high pH and high calcium ion concentration which characterize severe conditions in the traditional art of scale inhibition may also characterize some of the stringent conditions encountered in the processing of black liquor, it is conjectured that this factor may be responsible for the failure of traditional threshold inhibitors used heretofore to provide effective scale control on equipment used to process black liquor.

BRIEF DESCRIPTION OF THE PRIOR ART

In the traditional scale inhibition art relating to boilers, cooling towers, etc., early efforts to reduce scale formation employed compounds such as tannins, modified lignins, algins, and other similar materials. Chelating or sequestering agents were also employed to prevent precipitation or crystallization of scale-forming calcium carbonate. Another type of agent which has been actively explored heretofore as a calcium carbonate scale inhibiting material is the threshold active inhibitor. Such materials are effective as scale inhibitors in amounts considerably less than that stoichiometrically required, and this amount is termed the threshold amount. Inorganic polyphosphates have long been used as such threshold active inhibitors in the traditional scale inhibition art. For examples of such materials, see Fink—U.S. Pat. No. 2,358,222; Hatch—U.S. Pat. No. 2,539,305; and Ralston U.S. Pat. No. 3,434,969. Certain water soluble polymers, including groups derived from acrylamide and acrylic acid have been used to condition water containing scale-forming calcium carbonate. For example, see U.S. Pat. No. 2,783,200; 3,514,476;

2,980,610; 3,285,886; 3,463,730; 3,518,204; 3,928,196; 3,965,027; and 4,936,987. In particular, there has been employed anionic polyelectrolytes such as polyacrylates, polymaleic anhydrides, copolymers of acrylates and sulfonates, and polymers of sulfonated styrenes. See, for example, U.S. Pat. No. 4,640,793; 4,650,591; 4,671,888 and 4,072,607. However, when used as threshold alkaline earth metal scale inhibitors, large dosages of these polymers are required, which in turn increases operating costs.

U.S. Pat. No. 4,457,847 discloses-antiscalant use of a water-soluble sequestrant anionic vinyl polymer containing at least 30% by weight of carboxylate functionality, and having a molecular weight within the range of 500–50,000.

While various polycarboxylates, including polyacrylic acid, have been used as scale inhibiting agents in the traditional scale inhibition art, as described above, no similar use has been made of polycationic agents, apparently because of the difference in electronic charge and the conventional theories of the mechanisms of action for polymeric threshold inhibitors and dispersants. However, Goodman U.S. Pat. No. 4,164,521; 4,166,040; and 4,205,143 disclose compositions for inhibiting magnesium scale in desalination evaporators comprising mixtures of a polyanionic such as acrylic acid and a polycationic including poly(dimethyldiallylammonium chloride); but, there is no suggestion of the use of such compositions to control black liquor scale in papermaking, or of the preferred embodiments of the present invention, which have particularly advantageous properties in that regard.

As already stated, none of the scale inhibition agents used in the traditional scale inhibition art and described above have met with any notable success when used to prevent scale formation in black liquor processing. These agents have shown little or no effect in overcoming the specific problem of scale deposit formation under the stringent conditions which characterize black liquor processing in paper making. Some specific applicability to this area has been asserted for certain compositions, but little success in actual practice .has been realized. For example, U.S. Pat. No. 4,357,207 discloses the use of cationic polymers having a molecular weight of from 2,000 to 50,000 to inhibit and disperse deposits on black liquor evaporators. U.S. Pat. No. 3,516,910 discloses the use of polymethacrylates and related polyalkylacrylates having a molecular weight from 1,000 to 200,000 to inhibit deposit formation on black liquor evaporators. U.S. Pat. No. 3,289,734 discloses a method of inhibiting deposit formation on black liquor evaporators by treatment with a styrene-maleic anhydride copolymer having a molecular weight of less than 10,000.

It is probable that the anionic/cationic polymer mixture of the present invention forms a water-soluble non-stoichiometric polyelectrolyte complex. Such materials are known and have been investigated in the past, but never with any suggestion that they would be useful in scale inhibition in a normal setting, let alone under the stringent conditions which characterize black liquor processing in paper making. See, e.g., Kabanov and Zezin, *Makromol. Chem. Suppl.* 6,259–276 (1984).

SUMMARY OF THE INVENTION

The present invention relates to a composition useful as a deposit control agent to control the formation, depositon and adherency of scale imparting compounds in an aqueous system involving the processing of black liquor during paper making, comprising an anionic/cationic polymer mixture of:

(a) a polyanion selected from polyacrylic acid, polymethacrylic acid, and polymaleic anhydride, each optionally copolymerized with each other, or optionally copolymerized with acrylamide up to a molar unit ratio of 1:1, provided that the total polyanionic weight average molecular weight is from about 1 to 5 thousand, and (b) the polycation poly(dimethyldiallylammonium chloride) having a weight average molecular weight of from about 25 thousand to about 1 million, wherein the weight ratio of polyanion (a) to polycation (b) is from about 1:2 to about 1:8.

The present invention particularly relates to the composition described above for controlling the deposition of sodium sulfate, sodium carbonate, organic matter, and calcium carbonate on the surfaces of black liquor evaporators and heaters associated with Kamyr digesters, wherein the composition is a mixture of polyacrylic acid having a weight average molecular weight of about 2 thousand, and poly(dimethyldiallylammonium chloride) having a weight average molecular weight of about 1 million, and the weight ratio of polyanion to polycation is about 1:2.

The present invention also relates to a method of inhibiting the formation, deposition and adherency of scale-forming salts in an aqueous system involving the processing of black liquor during paper making, comprising the step of adding to said system an amount sufficient to establish a concentration of from 1 to 100 mg/L of an anionic/cationic polymer mixture of:

(a) a polyanion selected from polyacrylic acid, polymethacrylic acid, and polymaleic anhydride, each optionally copolymerized with each other, or optionally copolymerized with acrylamide up to a molar unit ratio of 1:1, provided that the total polyanionic weight average molecular weight is from about 1 to 5 thousand, and (b) the polycation poly(dimethyldiallylammonium chloride) having a weight average molecular weight of from about 25 thousand to about 1 million, wherein the weight ratio of polyanion (a) to polycation (b) is from about 1:2 to about 1:8.

The present invention particularly relates to the method of treatment described above for controlling the deposition of sodium sulfate, sodium carbonate, organic matter, and calcium carbonate on the surfaces of black liquor evaporators and heaters associated with Kamyr digesters; wherein the composition is a mixture of polyacrylic acid having a weight average molecular weight of about 2 thousand, and poly(dimethyldiallylammonium chloride) having a weight average molecular weight of about 1 million, and the weight ratio of polyanion to polycation is about 1:2; and wherein the concentration of the composition is from 10 to 50 mg/L.

DETAILED DESCRIPTION OF THE INVENTION

The composition of the present invention useful as a deposit control agent to control the formation, deposition and adherency of scale imparting compounds in an aqueous system Involving the processing of black liquor during paper making, comprises an anionic/cationic polymer mixture of:

(a) a polyanion selected from polyacrylic acid, polymethacrylic acid, and polymaleic anhydride, each optionally copolymerized with each other, or optionally copolymerized with acrylamide up to a molar unit ratio of 1:1, provided that the total polyanionic weight average molecular weight is from about 1 to 5 thousand, and (b) the polycation poly(dimethyldiallylammonium chloride) having a weight average molecular weight of from about 25 thousand to about 1 million, wherein the weight ratio of polyanion (a) to polycation (b) is from about 1:2 to about 1:8.

The polyanion is selected from polyacrylic acid, polymethacrylic acid, and polymaleic anhydride, whose compositions may be represented in structural form by the following general formulas, respectively:

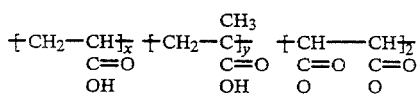

where "x", "y" and "z" are numbers representing repeating monomer units sufficient to obtain the desired weight average molecular weight.

It will be understood that the polyanions shown above are represented as polycarboxylic acids, but that the alkali metal and ammonium salts thereof may be employed as well.

In the most preferred embodiments of the present invention, the polyanion component of the anionic/cationic polymer mixture is a homopolymer, e.g., polyacrylic acid. However, in less preferred embodiments, it is also possible to use copolymers and even terpolymers as the polyanion component which comprise the members of the group from which the polyanion is selected. For example, a copolymer of acrylic acid and methacrylic acid, or acrylic acid and maleic anhydride may be employed. The terpolymer would comprise acrylic acid, methacrylic acid, and maleic anhydride.

It is also optional to copolymerize a homopolymer of acrylic acid or maleic anhydride, for example, with acrylamide, or a copolymer of methacrylic acid and maleic anhydride, for example, with acrylamide. Polyacrylamide is a nonionic polymer material and, as such, is not viewed as disturbing the balance of anionic and cationic charges which are theorized to be essential to the functioning of the anionic/cationic polymer mixtures of the present invention. The polyacrylamide portion does, however, add molecular weight to the polyanion component and is, consequently, viewed as essentially diluting the extent of anionic charge, or charge density. For that reason, it is a limitation of the present invention that the molar unit ratio of optional acrylamide monomer to the total of anionic monomers (if more than one is used), can be no more than 1:1, i.e., up to 1:1. For example, if an acrylamide/acrylic acid copolymer is used in a 1:1 ratio, since the molecular weights are nearly equal, the requirement that the anionic component molecular weight be between 1 and 5 thousand would mean that the overall weight average molecular weight of the poly(acrylamide/acrylic acid) should be between 2 and 10 thousand.

However, in the most preferred embodiments of the present invention, polyacrylic acid is used as a homopolymer and is not copolymerized with acrylamide. For the polyacrylic acid component, it is also most preferred to use the homopolymer having a molecular weight of about 2 thousand, as a weight average molecular weight, which would be understood to be an approximately average number and subject to reasonable variation.

As noted, it is essential that the weight average molecular weight of the polyanion component of the anionic/cationic polymer mixture be in the range of from about 1 to 5 thousand, and in the most preferred embodiment, it is about 2 thousand. It has been found that when the molecular weight exceeds about 5 thousand, that a considerable reduction in scale inhibiting properties ensues. By contrast, the weight average molecular weight of the poly(dimethyldiallylammonium chloride) component of the anionic/cationic polymer mixture of the present invention must be at least about 25 thousand, but may go as high as about 1 million or even higher. In the most preferred embodiments of the present invention, the weight average molecular weight of the polycationic component is about 1 million. With very high molecular weights, however, scale inhibiting properties decline without any offsetting advantage.

The ratio of the anionic and cationic components of the polymer mixture compositions is another critical aspect of the present invention. That ratio is based on overall weight of the polymer components (rather than being a molar ratio) and can range from about 1:2 to about 1:8, but will preferably be in the range of from 1:2 to 1:4, and is most preferably about 1:2. Thus, the cationic component of the polymer mixture, i.e., the poly(dimethyldiallylammonium chloride), will usually be the predominant component by weight.

The compositions of the present invention are anionic/cationic polymer mixtures or blends, as distinct from random copolymers of the ordinary type. It is conjectured, however, that the mixture may form segmented block copolymers, as detailed further below. In any event, a significant difference in activity results. Thus, it has been discovered that when anionic polyacrylic acid and cationic poly(dimethyldiallylammonium choride) are combined in a copolymer at a weight ratio within the range of the polymer mixtures of the present invention, that no effect on adherency of the scale is achieved, in contrast to the results achieved with the compositions and methods of the present invention.

It is theorized that there is an interaction between the polyanion component of the polymer mixture and the $Na_2SO_4$, $Na_2CO_3$, $CaCO_3$ and other scale crystallites which constitute the nucleus of each scale particle potentially deposited, such that there is a threshold inhibition of formation of a particle of scale of sufficient size to be deposited; while the polycation poly(dimethyldiallylammonium chloride) component of the polymer mixture neutralizes the charges on the scale crystallites, thereby flocculating them and preventing them from producing adherent scale deposits.

The anionic and cationic polymer mixtures of the present invention, in the ranges of molecular weights and weight ratios described above, are blends of the two homopolymers. The blending is achieved with the use of conventional apparatus well known in the art, and no particular difficulty will be encountered inmaking the polymer blends which comprise the compositions of the present invention. Insoluble polysalt complexes may be formed, but these can be easily avoided by adjusting the pH so that the polyacrylic acid, normally anionic, is present as the un-ionized acid form.

The anionic/cationic polymer mixture of the present invention may be prepared either by adding the anionic homopolymer to the cationic homopolymer with mechanical stirring, or by reversing that order of addition. Because of the difference in molecular weights and weight proportions of the two components in the overall mixture, however, there is a clear difference in the way these two processes of preparation by mixing proceed on a molecular level. Where the higher molecular weight and higher weight proportion polycationic component is added to the polyanionic component, it is expected that there will be a tendency initially to form water-insoluble polysalt complexes, because at the point of addition the two components will tend to be present in stoichiometric amounts. However, as further amounts of the predominant polycationic component are added, any water-insoluble polysalt complexes which may have formed will be considered to have dissolved, i.e., the equilibrium with the water-soluble non-stoichiometric polyelectrolyte complexes being formed, will have shifted. Where the order of addition is reversed, i.e., where the polyanionic component is added to the polycationic component, there will be a tendency to more easily form the polyelectrolyte mixture of the present invention, since the polyanionic component has the smallermolecular weight is is present in a smaller weight proportion.

It is theorized that the polyanionic and polycationic components of the polymer mixtures of the present invention may form what are, in effect, segmented block copolymers in which the polyanionic component alligns itself in discrete segments with the longer chains of the polycationic component by ionic bonding. However, not only are these polyanionic segments capable of movement within the same polycationic chain or to a different polycationic chain, but it is also clear that the segmented nature of the polyelectrolyte complex formed will result in hydrophilic and hydrophobic regions which can be both intramolecular and intermolecular, i.e., they can result in conformational changes within a single anionic/cationic complex, or result in agglomeration of such complexes by mutual attraction of the hydrophobic regions. One or more, or even all of these effects may play a critical role in enabling the anionic/cationic polymer mixtures of the present invention to inhibit, at threshold levels of concentration, the formation, deposition and adherency of scale-forming salts under the stringent conditions of black liquor processing in paper making, where virtually all conventional agents tried heretofore have failed.

When any of the anionic and cationic polymer mixture compositions of the present invention are used to inhibit the precipitation, deposition, and adherence of scale-forming salts in an aqueous system involving black liquor processing during papermaking, they can be effectively employed for that purpose when added in amounts sufficient to establish a concentration in said black liquor processing aqueous system of from 1 to 100 mg/L. Preferably, the amount added will be sufficient to establish a concentration of from 5 to 75 mg/L, and most preferably, the amount added will be sufficient to establish a concentration of from 10 to 50 mg/L of the compound. It is understood, however, that many factors, of the type which have been explained in detail with regard to the background to the present invention, will determine the actual amount of the anionic and cationic polymer mixture compositions of the present invention which will be added to said black liquor processing aqueous system in order to achieve the maximum amount of inhibition of alkaline earth metal, especially calcium carbonate scale formation, deposition and adherence in said aqueous system. The calculation of those amounts will be well within the skill of the artisan in this field.

The phrases "inhibiting the precipitation" and "inhibiting the formation and deposition" are meant to include threshold inhibition, dispersion, solubilization, or particle size reduction. The phrases "inhibiting the adherence" and "increasing the non-adherence", are meant to define the formation of a scale deposit which is easily removed, e.g., by simple rinsing, i.e., a scale deposit which is not so firmly bonded to the surface to which it is attached that it cannot be removed by simple agitation means as opposed to harsh mechanical or chemical treatment.

The phrase "scale-forming salts" is meant to include any of the scale-forming salts, including, but not limited to, sodium sulfate, sodium carbonate, calcium carbonate, calcium sulfate, calcium phosphate, calcium phosphonate (including calcium hydroxyethylidene diphosphonic acid), calcium oxalate, calcium fluoride, barium sulfate and magnesium salts.

The phrase "black liquor processing aqueous system" means any of those points or areas in the paper making process and its attendant equipment in which black liquor is processed in such a way that it comes in contact with heat exchange surfaces, usually of metal, or in which it otherwise has a tendency to form adherent scale deposits. Thus, these include, e.g., black liquor evaporators and black liquor heaters and flash evaporators used in conjunction with Kamyr and other similar wood chip digesters. These examples are not meant to be limiting, however, since there are other points and areas in such Kamyr and other digesters where the black liquor tends to leave an adherent scale deposit.

The manner of addition of any particular anionic and cationic polymer mixture composition of the present invention, to a black liquor processing aqueous system will also be straightforward to a person of ordinary skill in this art. It may be added in liquid blend form by mechanical dispensers of known design. It may also be added in diluted liquid form. The anionic and cationic polymer mixture composition may also be combined with other chemical treatment agents for dispensing to the black liquor processing aqueous system; and these in combination may be dispensed in liquid form.

The anionic/cationic polymer mixtures of the present invention may be added at a number of different points in the paper making process so as to become dispersed in the black liquor processing aqueous system. Considerations of convenience and efficiency will usually govern this choice. The mixtures are effective when added to the steam lines or to the vapor phase above any particular black liquor processing unit such as a heater or evaporator. The mixtures may also be added directly to the black liquor in such units, or to any of the lines which transport the black liquor from place to place. The mixtures may also be added to the wash or white liquor, which is essentially dilute black liquor prior to its concentration to form what is traditionally known as black liquor. It is also possible to add the mixtures of the present invention at two or more of the points in the paper making process described above. As a general matter, however, it is preferred to add the mixtures of the present invention at a single point early in the paper making process where black liquor processing aqueous systems become involved, so that the treatment composition will be available during any processing of the black liquor by being carried through with the black liquor.

The compositions and methods of treatment of the present invention described above are effective in reducing deposit formation occurring upon a variety of metal surfaces. Protection is afforded equipment made of ferrous metals such as iron and steel or non-ferrous metals such as, e.g., brass, which are or may be exposed to black liquor during evaporation, condensation, transportation, concentration, or other chemical and physical processing of black liquors.

EXAMPLES OF PREFERRED EMBODIMENTS

Example 1

Experimental Autoclave Study

The study was done in an autoclave made of Inconel. A U shaped tube made of No. 316 stainless steel, suspended from the lid of the autoclave was used as the test specimen for measuring deposit. One liter of black liquor containing an additional 170 mg of calcium ions was charged into the autoclave. The control experiment contained no inhibitor, while the treated experiments contained different levels of treatment. A clean, polished (with 320 grit sand paper), and preweighed specimen tube was put in place. A long shaft with two stirring propellers at different heights was attached to the inside of the lid and this shaft at the outside of the lid was equipped with a pully. The pully was attached by a belt to a motor by means of which stirring of the liquor was accomplished. The autoclave was inserted into a jacket containing an electrical heater. A thermocoupler was inserted into a pocket attached to the inside of the autoclave lid. The signal from the thermocoupler was fed to the voltage controller of the heater to maintain a pre-set constant temperature inside the autoclave throughout the experiment. Theautoclave was also equipped with a pressure guage to measure the pressure inside the autoclave.

The liquor containing additional calcium with or without the treatment was heated for 6 days at a constant temperature of 150° C. and ~180 PSI pressure, after which it was cooled to 42° C. before opening of the autoclave. To clean the superficial liquor from the specimen tube, it was dipped into distilled water for 2–3 seconds while still attached to the lid. The specimen tube was detached from the lid, dried at 105° C. and weighed.

The composition of the black liquor containing additional calcium which was utilized in the above study was as follows:

TABLE 1

| Characterization-of Black Liquor | |
|---|---|
| Contents | Amount ppm |
| pH - 13.8 | |
| Total Solids (105° C.) | 450,000 |
| Dissolved Solids | 224,000 |
| Suspended Solids | 2,300 |
| Total Organics | 60,000 |
| Total Ca | 420 |
| Dissolved Ca | 330 |
| Dissolved Hardness (CaCO3) | 1025 |
| Total Mg | 75 |
| Total Na | 72,500 |
| Total K | 15,500 |
| Total SO4 | 8,000 |

TABLE 1-continued

| Characterization-of Black Liquor | |
|---|---|
| Contents | Amount ppm |
| Total Cu | 05 |
| Total Fe | 10 |
| Total Mn | 25 |
| Total Al | 20 |
| Total Zn | 05 |
| Total Ni | 05 |
| Total CrO4 | 05 |

The results obtained from the above autoclave study, in which the treatment composition was an embodiment of the present invention, being a mixture of 1:4 of polyacrylic acid (AA) of about 3000 weight average molecular weight, and poly(dimethyldiallyl ammonium chloride) (DMDAAC) of about 40–70 thousand weight average molecular weight, are illustrated in the following table of values:

TABLE 2

| Treatment | Dosage (ppm) | Deposit (g) |
|---|---|---|
| Blank | — | 8.69 |
| Blank | — | 7.14 |
| 1:4 AA/DMDAAC | 30 | 0.13 |
| 1:4 AA/DMDAAC | 15 | 0.71 |
| 1:4 AA/DMDAAC | 7.5 | 2.28 |

EXAMPLE 2

Following the procedures described above in Example 1, and using the preferred embodiment of the present invention in which the polyanion is polyacrylic acid of weight average molecular weight about 2 thousand, and the polycation is poly(dimethyldiallylammonium chloride) of weight average molecular weight about 1 million, and the weight ratio of the first to the second is about 1:2, similar results are obtained showing the composition to be an effective inhibitor of black liquor scale deposition.

What is claimed is:

1. A method of inhibiting the formation deposition and adherency of scale-forming salts in an aqueous black liquor system having a pH of at least 12.0, involving the processing of black liquor during paper making, comprising the step of adding to said system an anionic/cationic polymer mixture of:
   (a) a polyanion selected from polyacrylic acid, polymethacrylic acid, and polymaleic anhydride, each optionally copolymerized with each other, or optionally copolymerized with acrylamide up to a molar unit ratio of 1:1, provided that the total polyanionic weight average molecular weight is from about 1 to 5 thousand, and
   (b) a polycation comprising poly(dimethyldiallylammonium chloride) having a weight average molecular weight of from about 25 thousand to about 1 million,
   wherein the weight ratio of polyanion (a) to polycation (b) is from 1:2 to about 1:8, in an amount sufficient to establish a concentration of from 1 to 100 mg/L in said system.

2. A method according to claim 1 wherein the weight average molecular weight of the poly(dimethyldiallylammonium chloride) is about 1 million.

3. A method according to claim 1 wherein the weight ratio of (a) to (b) is from 1:3 to 1:5.

4. A method according to claim 1 wherein the weight ratio of (a) to (b) is 1:2.

5. A method of treatment according to claim 2 which comprises controlling the deposition of sodium sulfate, sodium carbonate, organic matter, and calcium carbonate on the surfaces of black liquor evaporators and heaters associated with Kamyr digesters; wherein the polymer mixture is a mixture of polyacrylic acid having a weight average molecular weight of about 2 thousand and poly(dimethyldiallylammonium chloride) having a weight average molecular weight of about 1 million, and the weight ratio of polyanion to polycation is about 1:2; and wherein the concentration of the polymer mixture is from 10 to 50 mg/L.

* * * * *